(12) United States Patent
Chen et al.

(10) Patent No.: US 8,786,937 B2
(45) Date of Patent: Jul. 22, 2014

(54) DUAL-POLARIZATION QPSK DEMODULATOR

(75) Inventors: Fan Chen, Shanghai (CN); Fahua Lan, Shanghai (CN); Huiping Li, Shanghai (CN); Kevin Dapeng Zhang, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 214 days.

(21) Appl. No.: 13/304,948

(22) Filed: Nov. 28, 2011

(65) Prior Publication Data
US 2012/0205521 A1 Aug. 16, 2012

(30) Foreign Application Priority Data

Feb. 14, 2011 (CN) .......................... 2011 1 0037456

(51) Int. Cl.
*G02F 2/00* (2006.01)
(52) U.S. Cl.
USPC ............................................ 359/325; 385/11
(58) Field of Classification Search
USPC ............................................ 359/325; 385/11
See application file for complete search history.

(56) References Cited

U.S. PATENT DOCUMENTS

| 6,134,031 | A  | * | 10/2000 | Nishi et al. ...................... 359/15 |
| 6,208,442 | B1 | * | 3/2001  | Liu et al. ........................... 398/9 |
| 6,900,938 | B2 | * | 5/2005  | Zhao ......................... 359/489.07 |
| 7,173,763 | B2 | * | 2/2007  | Du et al. ........................ 359/256 |
| 7,529,490 | B2 | * | 5/2009  | Hoshida ......................... 398/207 |
| 7,860,394 | B2 |   | 12/2010 | Hoshida |
| 2010/0245837 | A1 |   | 9/2010  | Yamamoto |
| 2011/0019994 | A1 |   | 1/2011  | Frisken |
| 2012/0008951 | A1 | * | 1/2012  | Mikami ........................... 398/65 |

FOREIGN PATENT DOCUMENTS

CN 1815930 A 8/2006

OTHER PUBLICATIONS

European Search Report mailed May 2, 2012 for related European Patent Application No. EP 12 15 4705.

* cited by examiner

*Primary Examiner* — Daniel Petkovsek
(74) *Attorney, Agent, or Firm* — Maschoff Brennan

(57) ABSTRACT

In an embodiment, a DP-QPSK demodulator includes first, second and third polarization beam splitters ("PBSs") and first, second and third half waveplates ("HWPs"). The first HWP is positioned to receive an output of the first PBS. The second PBS is positioned to receive an output of the first HWP. The second HWP is positioned to receive an output of the second PBS. The third PBS is positioned to receive an output of the second HWP. The third HWP is positioned to receive an output of the third PBS.

20 Claims, 11 Drawing Sheets

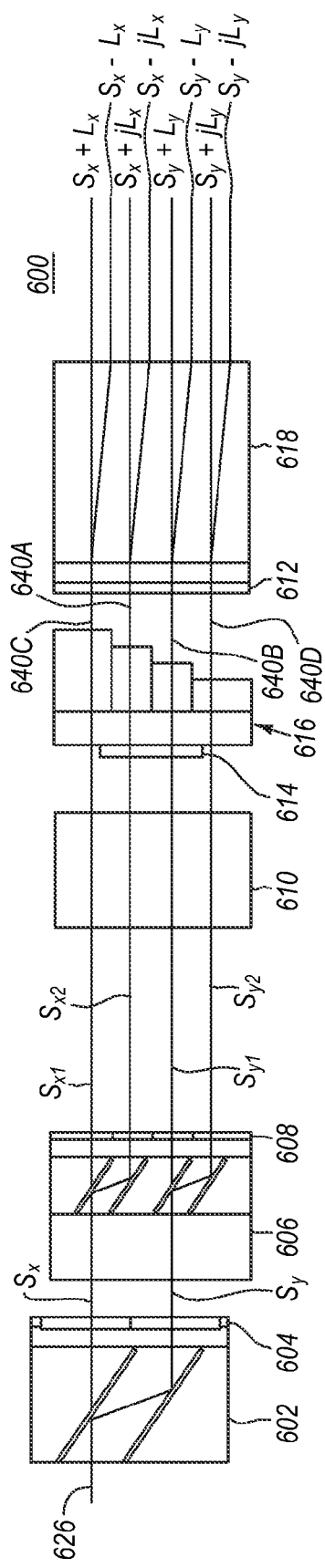
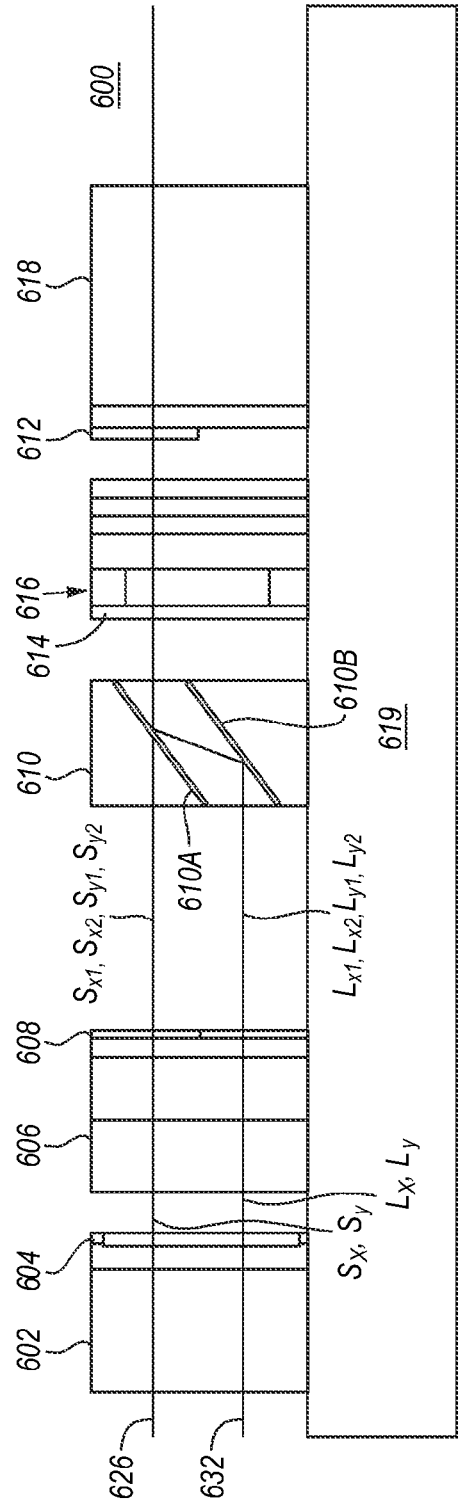
Fig. 6B
Fig. 6C

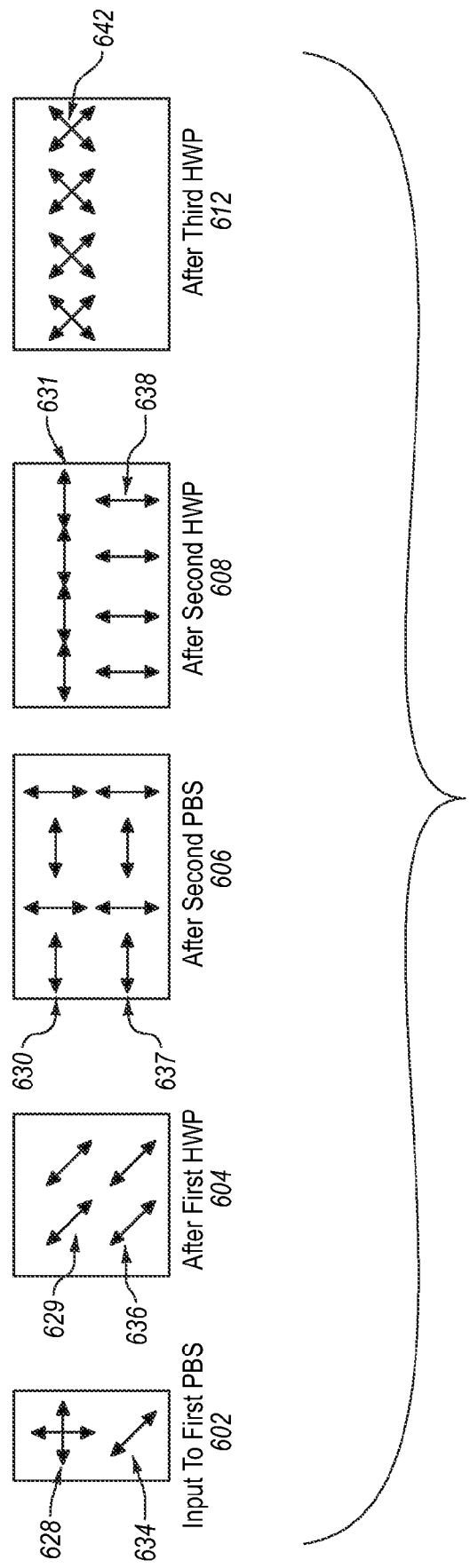

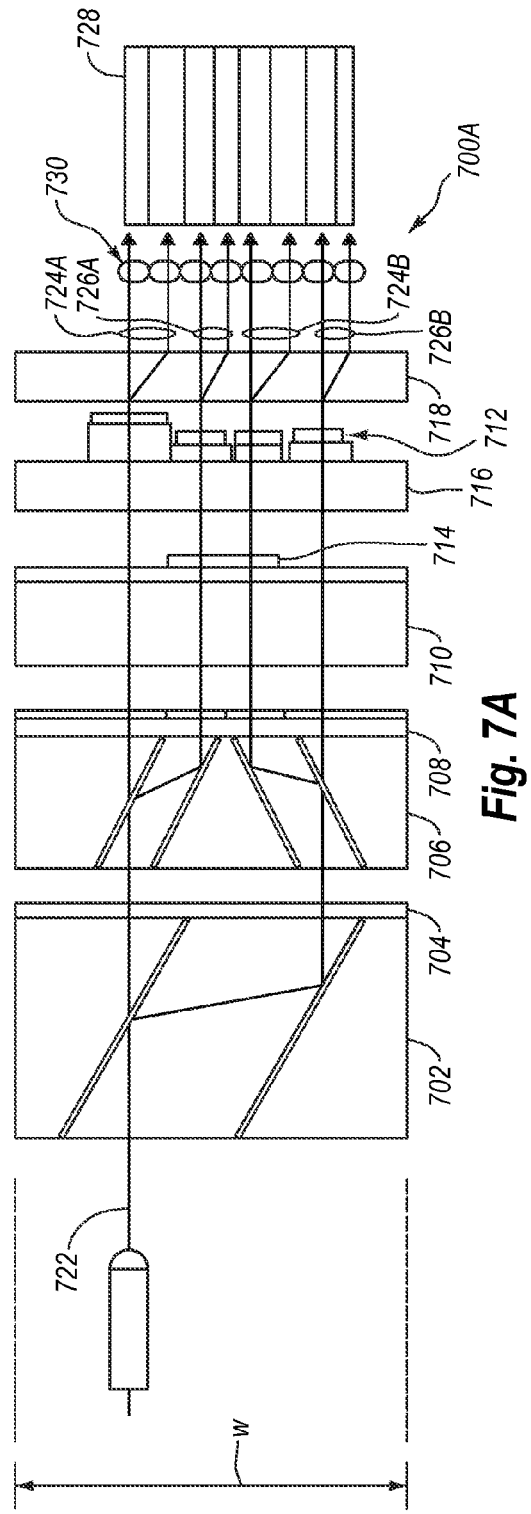
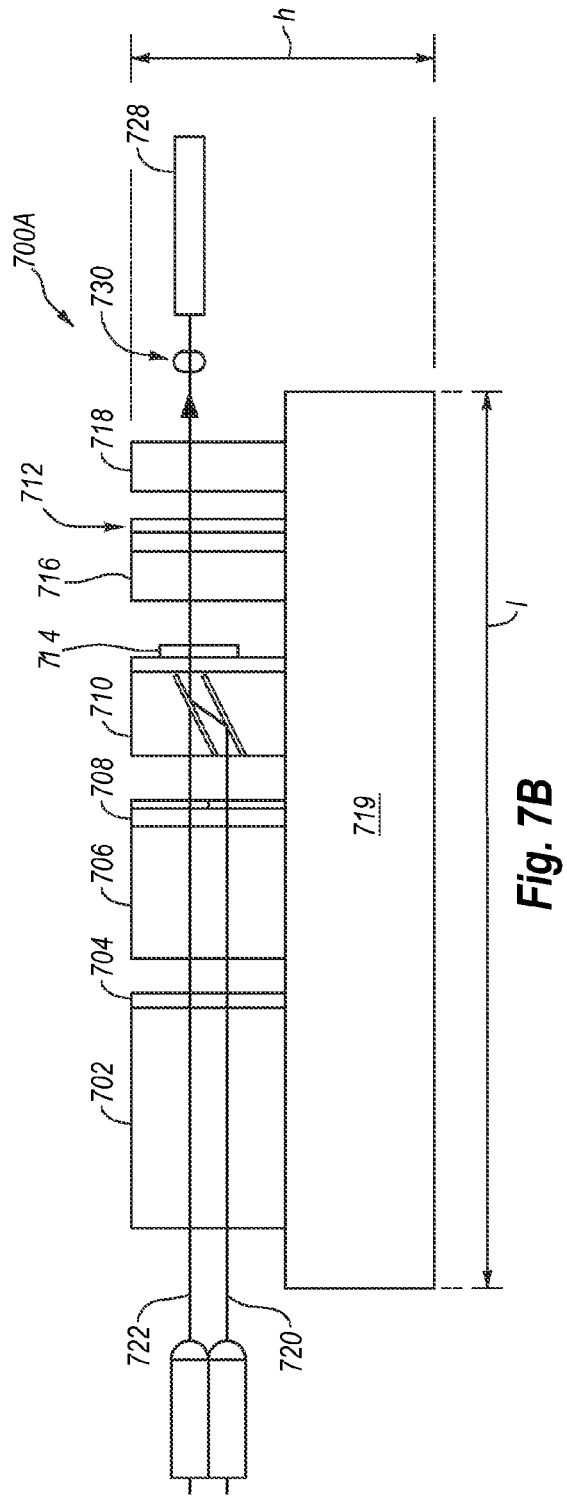
Fig. 7A
Fig. 7B

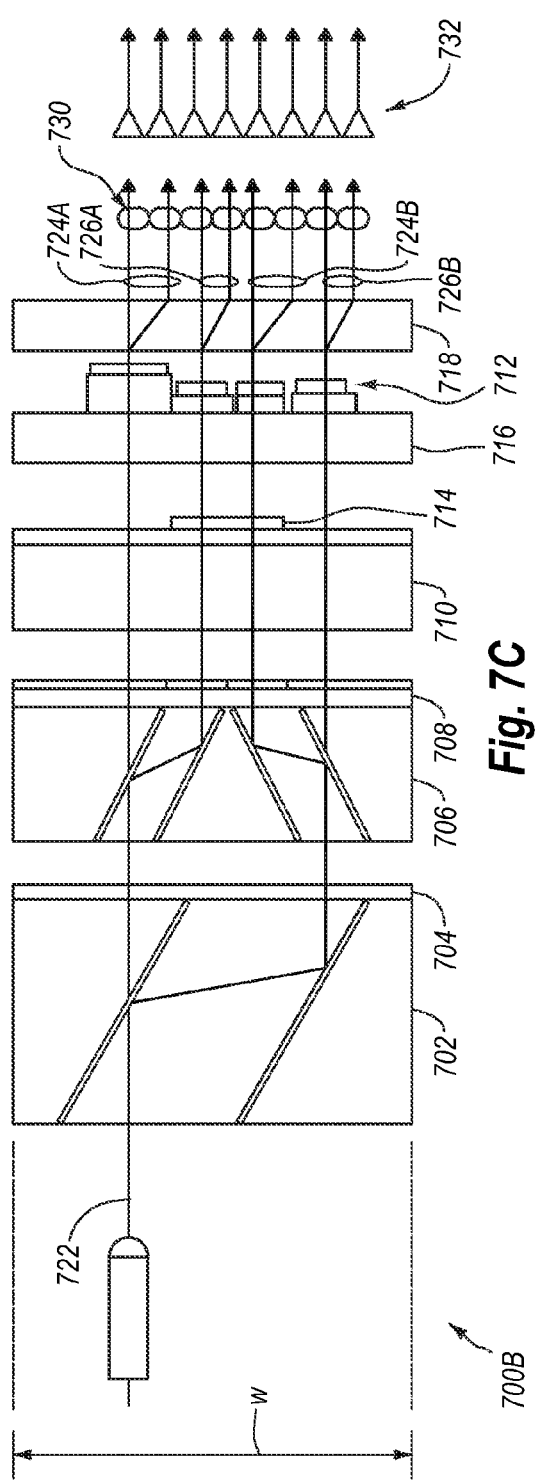
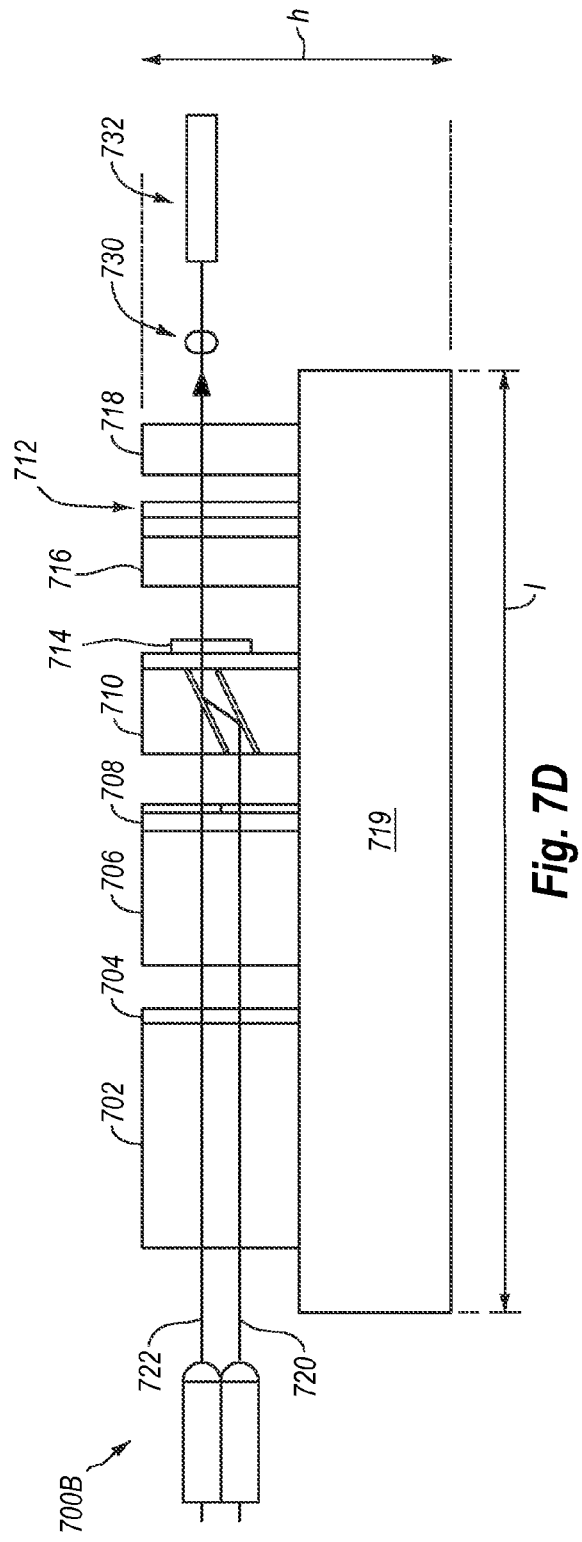
Fig. 7C
Fig. 7D

US 8,786,937 B2

DUAL-POLARIZATION QPSK DEMODULATOR

CROSS-REFERENCE TO RELATED APPLICATIONS

This application claims priority to and the benefit of Chinese Application No. 201110037456.1, entitled DUAL-POLARIZATION QPSK DEMODULATOR, filed with the Chinese Intellectual Property Office on Feb. 14, 2011, which is incorporated herein by reference in its entirety.

BACKGROUND

1. Field of the Invention

The present invention generally relates to optical communication systems. More particularly, some example embodiments relate to a dual-polarization ("DP")-quadrature phase shift keyed ("QPSK") demodulator that may be used in some optical communication systems.

2. Related Technology

Communication technology has transformed our world. As the amount of information communicated over networks has increased, high speed transmission has become ever more critical. High speed communications often rely on the presence of high bandwidth capacity links between network nodes. For optical links, an optoelectronic module such as a transceiver or transponder module at one network node converts electrical data into optical data for transmission on the optical channel. At the other network node, another transceiver module receives the optical signal, and converts the signal into an electrical signal. Transceivers are equipped with transmit and receive channels, such that bi-directional communication is possible.

Presently, standards are being developed for optical links at a staggering speed of 100 Gigabits per second (sometimes abbreviated as "100G"). In fact, the Institute for Electrical and Electronics Engineers, Inc. (often referred to as "IEEE" for short), a leading professional association in the art of networking technologies, has recently voted that the next generation of Ethernet technology will be 100 Gigabit Ethernet as well as some support for 40 Gigabit Ethernet, and has established several task forces to develop appropriate standards that are yet under development.

Currently, 100G Single Mode Fiber ("SMF") and Multi Mode Fiber ("MMF") standards for Ethernet optical link applications are under development. In general, however, on the transmit side, it is presently contemplated that such high speed transmitters will include a Media Access Control ("MAC") component that provides data electrically to an optical transmitter. However, since 100 Gigabits per second is simply too fast for present Complementary Metal Oxide Semiconductor ("CMOS") electrical I/O technology, the 100 Gigabits of electrical data will be provided in several independent electrical lanes.

For instance, perhaps 10 lanes of 10 Gigabits per second of data will be provided from the MAC component to the transmitter. If there were additional overhead used for encoding or error correction, perhaps the data rate for each lane may be increased and/or the number of lanes may be increased. For instance, 66B/64B encoding has been contemplated as being used to encode each lane of 10 Gigabits per second. This would result in each of the 10 lanes of electrical traffic being at an actual data rate of 10.3125 Gigabits per second.

In the transmitter, the 10 lanes of electrical traffic are serialized down to perhaps 4 lanes of optical data, each at a data rate of 25.78125 Gigabits per second, which includes the overhead for 66B/64B encoding. These 4 lanes of optical data may then be multiplexed onto a signal fiber using Wavelength Division Multiplexing ("WDM").

Ethernet data may be transported over longer distances by Dense Wavelength Division Multiplexing ("DWDM") systems. Currently, standards are under development for defining the use of DWDM technology for transporting 100G Ethernet data. The standard is referred to as OTU4 and encapsulates the Ethernet data in a payload which is then Forward Error Correction ("FEC") encoded. The resulting fiber data rate is approximately 112 Gigabits per second.

The system (hereinafter called the "100G DWDM OTU4 system") is contemplated as including two primary components, a Forward Error Correction capable MAC layer (called hereinafter an "OTU4/FEC processor") and a 100G DWDM capable transponder. In each of the transmit and receive channels, there are 10 lanes of 11 Gigabits per second data that are communicated using the OIF SFI-S interface specification. There is also an eleventh de-skew lane to align all 10 data lanes for serial data transmission.

One of the modulation technologies considered in this 100G DWDM OTU4 system is Dual-Polarization Quadrature Phase-Shift Keying (called "DP-QPSK" for short). The 112 Gigabit per second data stream is contemplated to be divided into four 28 Gb/s data streams, and modulates both I and Q phases of two orthogonally polarized optical carriers having the same wavelength that are transmitted as a single DP-QPSK signal.

On the receive side, an incoming DP-QPSK signal is separated into two orthogonally polarized optical carriers that are processed by a DP-QPSK demodulator to extract the modulation of the I and Q phases of each of the orthogonally polarized optical signals.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Some example embodiments generally relate to a DP-QPSK demodulator.

In an embodiment, a DP-QPSK demodulator includes first, second and third polarization beam splitters ("PBSs") and first, second and third half waveplates ("HWPs"). The first HWP is positioned to receive an output of the first PBS. The second PBS is positioned to receive an output of the first HWP. The second HWP is positioned to receive an output of the second PBS. The third PBS is positioned to receive an output of the second HWP. The third HWP is positioned to receive an output of the third PBS.

In an embodiment, an optoelectronic module includes a DP-QPSK demodulator, a plurality of optical detectors, and a digital signal processor ("DSP"). The DP-QPSK demodulator includes first, second and third PBSs and first, second and third HWPs. The first HWP is positioned to receive an output of the first PBS. The second PBS is positioned to receive an output of the first HWP. The second HWP is positioned to receive an output of the second PBS. The third PBS is positioned to receive an output of the second HWP. The third HWP is positioned to receive an output of the third PBS. The optical detectors are positioned to receive a plurality of optical signals output by the DP-QPSK demodulator and are configured to convert the plurality of optical signals to a plurality of electrical signals. The DSP is electrically coupled to respective outputs of the plurality of optical detectors.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 6B illustrates a top view of the DP-QPSK demodulator of FIG. 6A;

FIG. 6C illustrates a side view of the DP-QPSK demodulator of FIG. 6A;

FIG. 6D illustrates various polarization states associated with various signals at various points during passage through the DP-QPSK demodulator of FIG. 6A FIG. 7A illustrates a top view of another embodiment of a DP-QPSK demodulator such as may be implemented in the transponder system of FIG. 1;

FIG. 7B illustrates a side view of the DP-QPSK demodulator of FIG. 7A;

FIG. 7C illustrates a top view of yet another embodiment of a DP-QPSK demodulator such as may be implemented in the transponder system of FIG. 1; and FIG. 7D illustrates a side view of the DP-QPSK demodulator of FIG. 7C.

DETAILED DESCRIPTION OF THE PREFERRED EMBODIMENTS

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

I. Example Operating Environment

Figure 1:
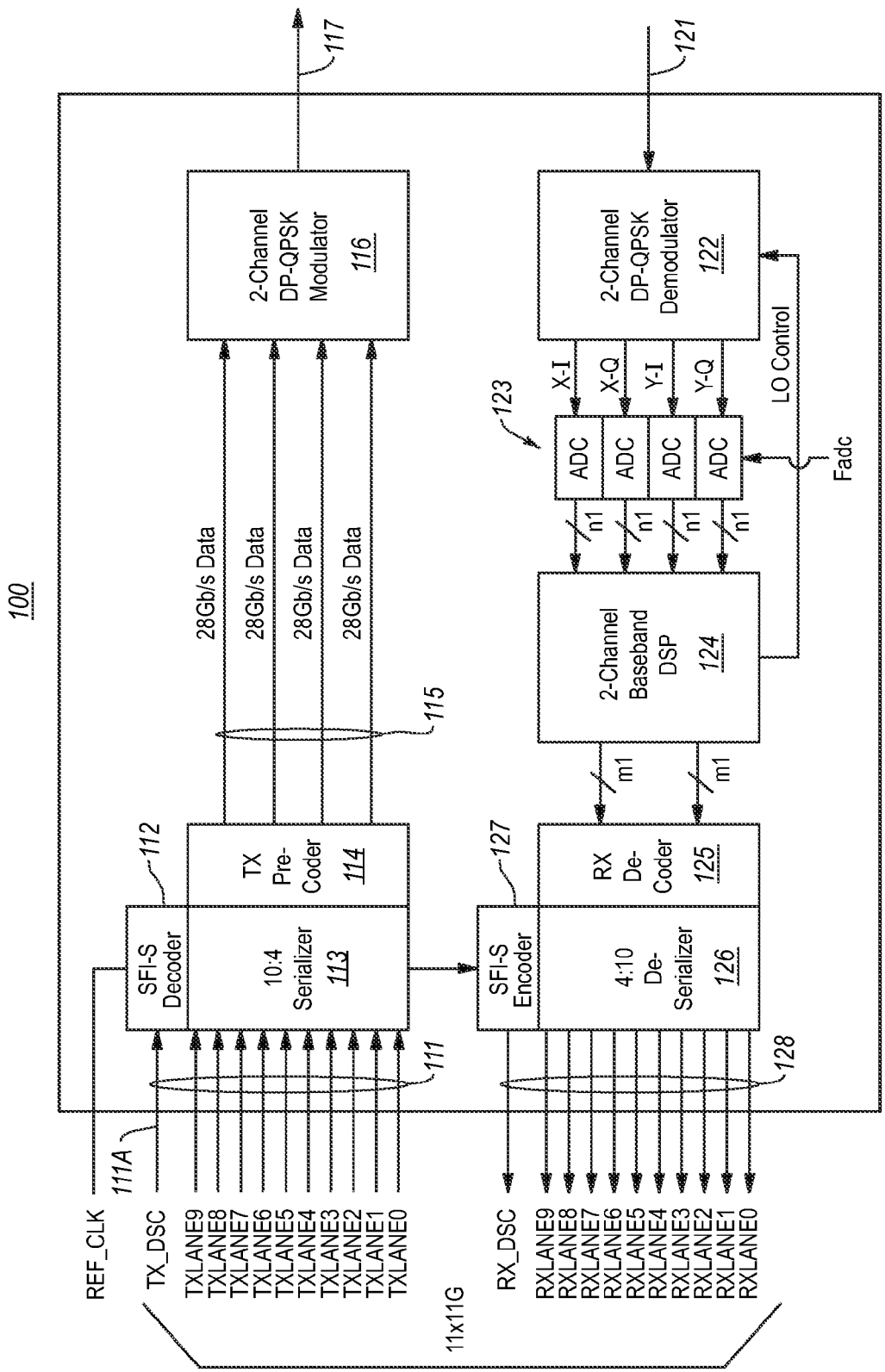
FIG. 1 illustrates a transponder system including a two-channel DP-QPSK modulator and a two-channel DP-QPSK demodulator according to some embodiments.

FIG. 1 illustrates a transponder system 100 (hereinafter "system 100") in which some embodiments disclosed herein may be implemented. The system 100 is discussed below in an example implementation as a 100G DWDM OTU4 system, with the understanding that the system 100 is not confined to implementation as a 100G DWDM OTU4 system, but may be adapted to suit any particular network standard, data rate, or the like. While the system 100 will be described in some detail, the system 100 is not intended to limit the present disclosure and is merely provided as an example of a system in which some embodiments can be implemented. Moreover, in some embodiments, the elements of system 100 may be packaged as an optoelectronic module.

On the transmit side, the system 100 receives 11 lanes (labeled collectively 111) of 11 Gigabits per second data. One lane 111A is received into an SFI-S decoder 112, and the remaining 10 lanes are received into a 10:4 serializer 113. The SFI-S decoder 112 and the serializer 113 receive a reference clock signal REF_CLK in order to maintain proper timing. The data is reduced to four lanes (labeled collectively 115) of 28 Gigabit per second data after being properly encoded using pre-coder 114. A two-channel DP-QPSK modulator 116 applies DP-QPSK modulation to the four lanes of data to thereby modulate all four lanes of data onto a single optical fiber 117. The modulation is accomplished by using both an X polarization and an orthogonal Y polarization of the optical signal as orthogonal information transport mechanisms, and also by using the in-phase and quadrature-phase portions of each polarization.

On the receive side, a receive optical signal (at a 112 Gigabit per second data rate) is received from the optical fiber 121 into a two-channel DP-QPSK demodulator 122. The received optical signal may be formulated by another network node in the same manner as the optical signal that was transmitted by DP-QPSK modulator 116. The two-channel DP-QPSK demodulator 122 extracts four components of the optical signal as follows: 1) an in-phase portion of the signal that had X polarization (labeled X-I), 2) a quadrature-phase portion of the signal that had X polarization (labeled X-Q), 3) an in-phase portion of the signal that had Y polarization (labeled Y-I), and 4) a quadrature-phase portion of the signal that had Y polarization (labeled Y-Q). Each of the X and Y polarizations has a bit rate of 56 Gigabits per second, and a symbol rate of 28 Gigasymbols per second, the symbols each representing two bits of information.

The four demodulated data signals X-I, X-Q, Y-I and Y-Q are then quantized by a bank of four Analog-to-Digital Converters ("ADCs") 123. Each ADC quantizes the corresponding demodulated data signal into an n1 bit digital signal, which is then provided to a two-channel baseband Digital Signal Processor ("DSP") 124. A local oscillator control signal "LO Control" is provided by the DSP 124 to the demodulator 122 thereby enabling a coherent receiver architecture. The DSP 124 identifies a corresponding point in an IQ symbol constellation chart for each of the X and Y polarizations, and outputs the corresponding 2 bit sequence for each. The bit sequences are decoded by the decoder 125, after which the 4:10 deserializer 126 and SFI-S encoder 127 deserializes the bits into 11 lanes (referenced collectively as 128) of SFI-S encoded data, each at approximately 11 Gigabits per second.

Figure 2:
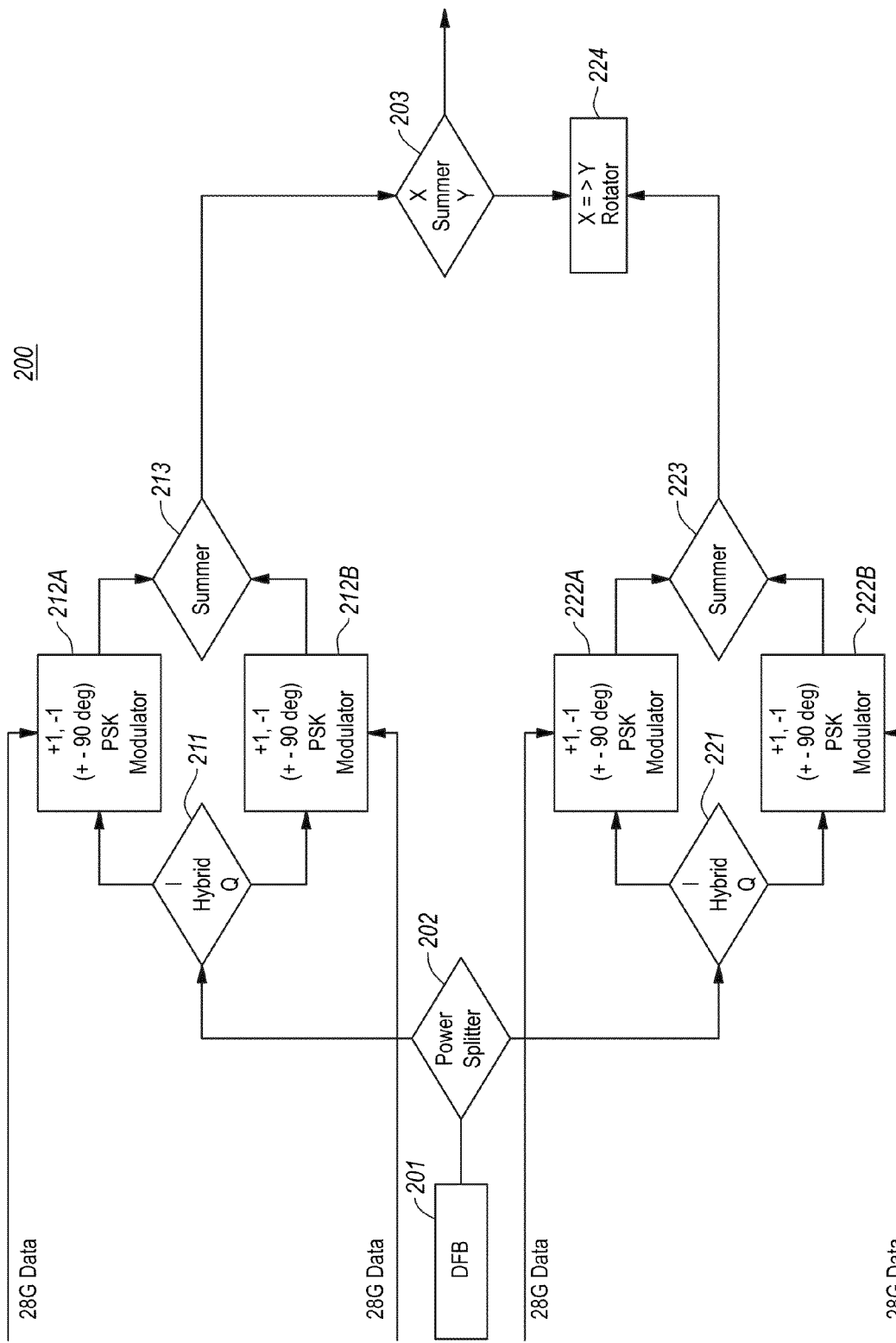
FIG. 2 illustrates an example conceptualization for the two-channel DP-QPSK modulator of the transponder system of FIG. 1 according to some embodiments.

FIG. 2 illustrates an example conceptualization 200 for the two-channel DP-QPSK modulator 116 of FIG. 1. There are two polarization branches in FIG. 2, an X polarization branch represented by the upper circuitry, and a Y polarization branch represented by the lower circuitry. Portions of a local oscillator ("LO") signal provided by a distributed feedback ("DFB") laser 201 or other LO source are fed into each polarization branch via the use of a power splitter 202.

As for the X branch, the continuous waveform from the DFB 201 is fed into a hybrid IQ circuit 211, which essentially causes a continuous in-phase waveform to be provided to an in-phase modulator 212A, and a 90 degree phase shifted version of the continuous waveform (i.e., a quadrature-phase waveform) to be provided to the quadrature-phase modulator 212B. A distinct 28 Gigabit per second signal is fed into each of the in-phase modulator 212A and the quadrature-phase modulator 212B causing appropriate phase shift keying of the optical signal. The in-phase and quadrature-phase keyed optical signals are then summed using optical summer 213.

The Y branch includes hybrid IQ circuit 221, in-phase modulator 222A, quadrature-phase modulator 222B, and summer 223, which may essentially be the same as the respective components 211, 212A, 212B, and 213 of the X branch. However, the Y branch receives its own distinct pair of 28 Gigabits per second signals for appropriate phase shift keying. In addition, an X to Y rotator 224 is provided to represent the summed keyed optical signals output by summer 223 using Y polarization. The X polarized signal and the Y polarized signal are then summed using optical summer 203, after which the summed optical signal may then be transmitted onto an optical fiber.

Figure 3:
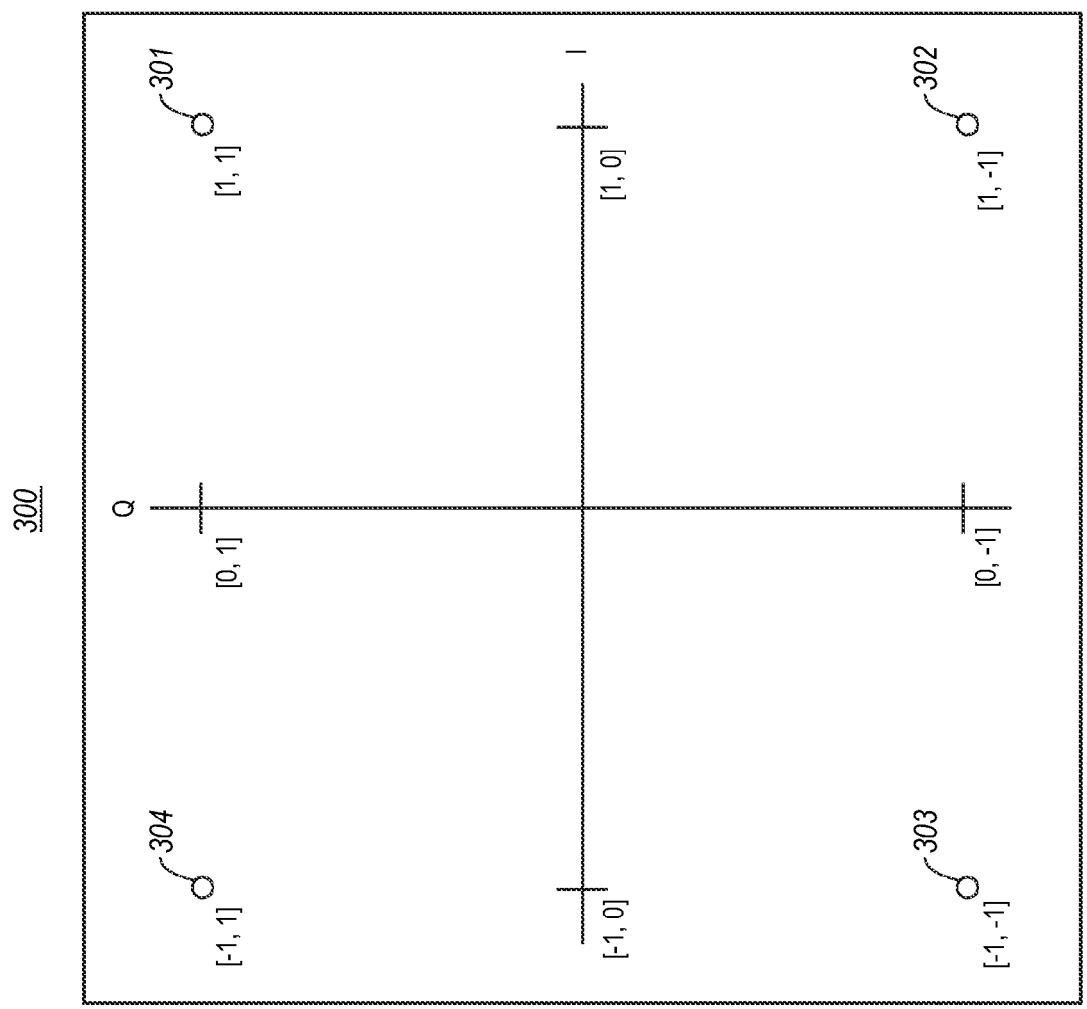
FIG. 3 illustrates a resulting four symbol IQ constellation graph according to some embodiments.

FIG. 3 illustrates a four symbol constellation IQ graph 300 that results from each of the Y polarization signal and the X polarization signal. There are four symbol points 301-304 shown in the IQ graph 300. When a particular signal is received for a certain polarization, the magnitude of the in-phase component and the quadrature-phase component is calculated. Based on that information, the closest symbol point is selected from the IQ graph 300. The corresponding 2 bit symbol (herein ml is equal to 2) is then output to the decoder 125. This is done for each of the X and Y polarization signals.

Figure 4:
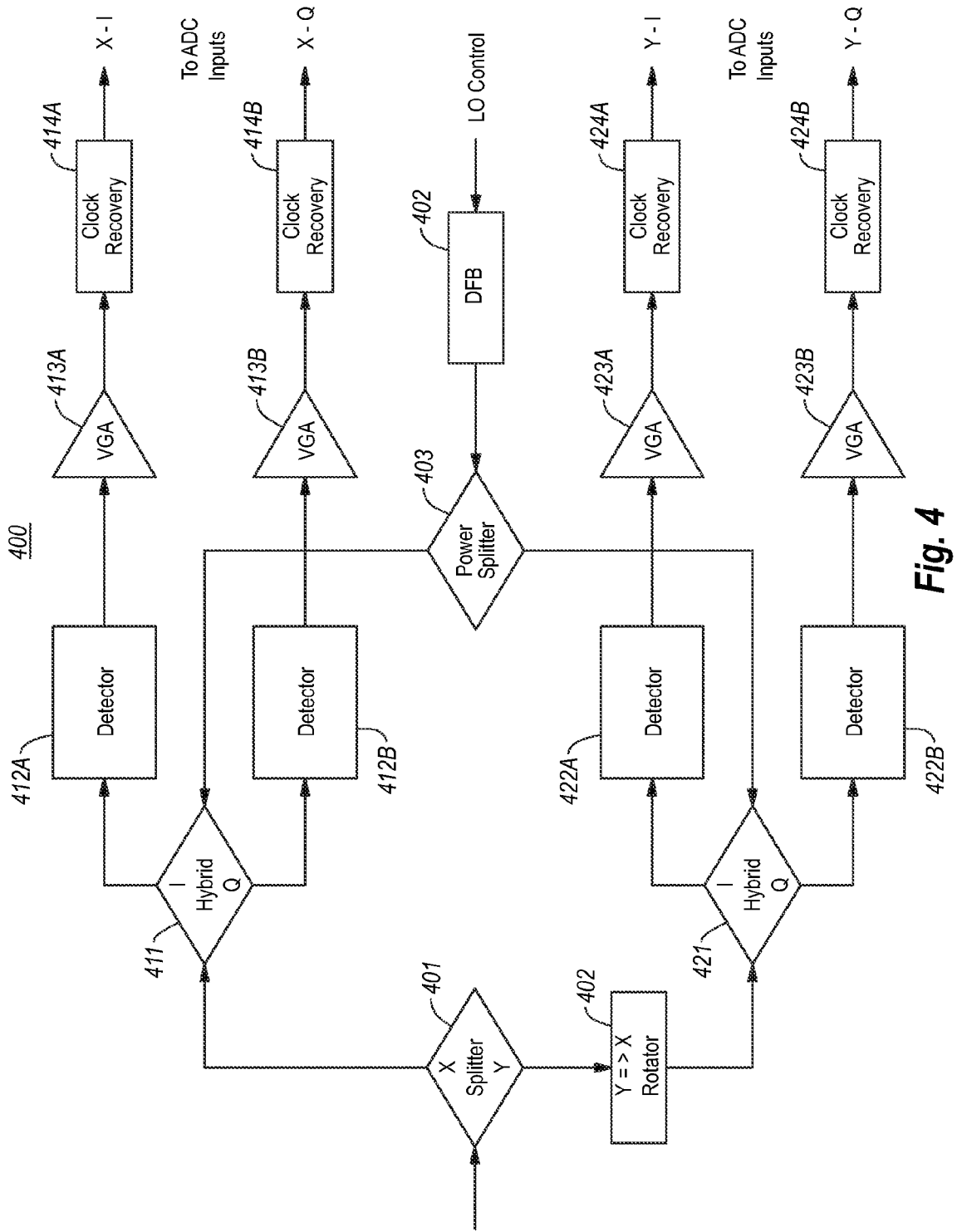
FIG. 4 illustrates an example conceptualization for the two-channel DP-QPSK demodulator of the transponder system of FIG. 1 according to some embodiments.

FIG. 4 illustrates an example conceptualization 400 for the two-channel demodulator 122 of FIG. 1. The optical signal is received into the X Y splitter 401, which provides the X polarized portion of the optical signal to the I/Q hybrid mixer 411 to start the X branch of demodulation. The X Y splitter 401 also provides the Y polarized portion of the optical signal to the Y to X rotator 402, which rotates the polarization of that optical signal to X polarization. That optical signal is provided to the I/Q hybrid mixer 421 to start the Y branch of demodulation.

The X and Y polarization optical signals are mixed in I/Q Hybrids 411 and 421 respectively with a continuous waveform LO signal provided by a DFB laser 402 via the power splitter 403 with the timing of the continuous waveform controlled by the LO Control signal. The resulting mixed signals are then provided to corresponding optical detectors 412A, 412B, 422A and 422B. Each corresponding electrical signal may be adjusted to a normalized level by respective Variable Gain Amplifiers ("VGAs") 413A, 413B 423A and 423B, after which they are subjected to clock recovery 414A, 414B, 424A and 424B. The clock recovery elements 414A, 414B, 424A and 424B should be viewed as functional transformations only, since the clock recovery may be provided for all channels using a single clock recovery circuit. This results in signals X-I, X-Q, Y-I and Y-Q described in FIG. 1. The VGA and Clock Recovery performance may be improved by using error signals derived in a corresponding two-channel Baseband DSP, such as the two-channel Baseband DSP 124 of FIG. 1.

The optical detectors 412A, 412B, 422A, 422B of FIG. 4 may be implemented as four single-ended optical-to-electrical (hereinafter "opto-electrical") converters. Examples of suitable opto-electrical converters include, for instance, positive-intrinsic-negative ("PIN") photodiodes, or the like. Alternatively, each of optical detectors 412A, 412B, 422A, 422B may include a pair of balanced opto-electrical converters.

II. Example Receive System

Figure 5A:
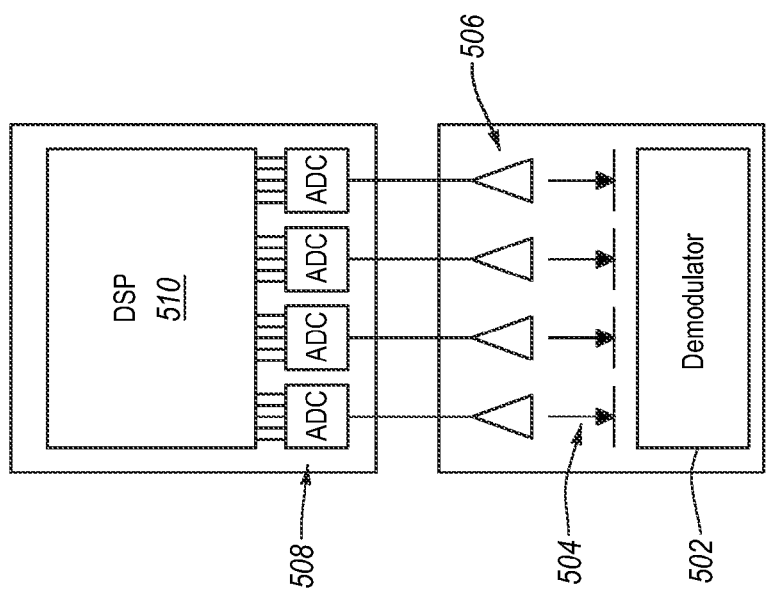
FIGS. 5A-5B illustrate aspects of a receive system including a DP-QPSK demodulator according to some embodiments.

FIG. 5A illustrates a receive system 500 according to some embodiments. The receive system 500 may be implemented in a transponder system, such as the system 100 of FIG. 1. In particular, the receive system 500 may correspond to at least a portion of the receive side of system 100, including the two-channel DP-QPSK demodulator 122, ADCs 123 and two-channel Baseband DSP 124.

As shown, the receive system 500 includes DP-QPSK demodulator 502, a plurality of optical detectors 504, a plurality of amplifiers 506, a plurality of ADCs 508, and DSP 510. The optical detectors 504 may include, for instance, four single-ended opto-electrical converters, or eight balanced opto-electrical converters arranged in pairs, or any other suitable configuration.

Figure 5B:
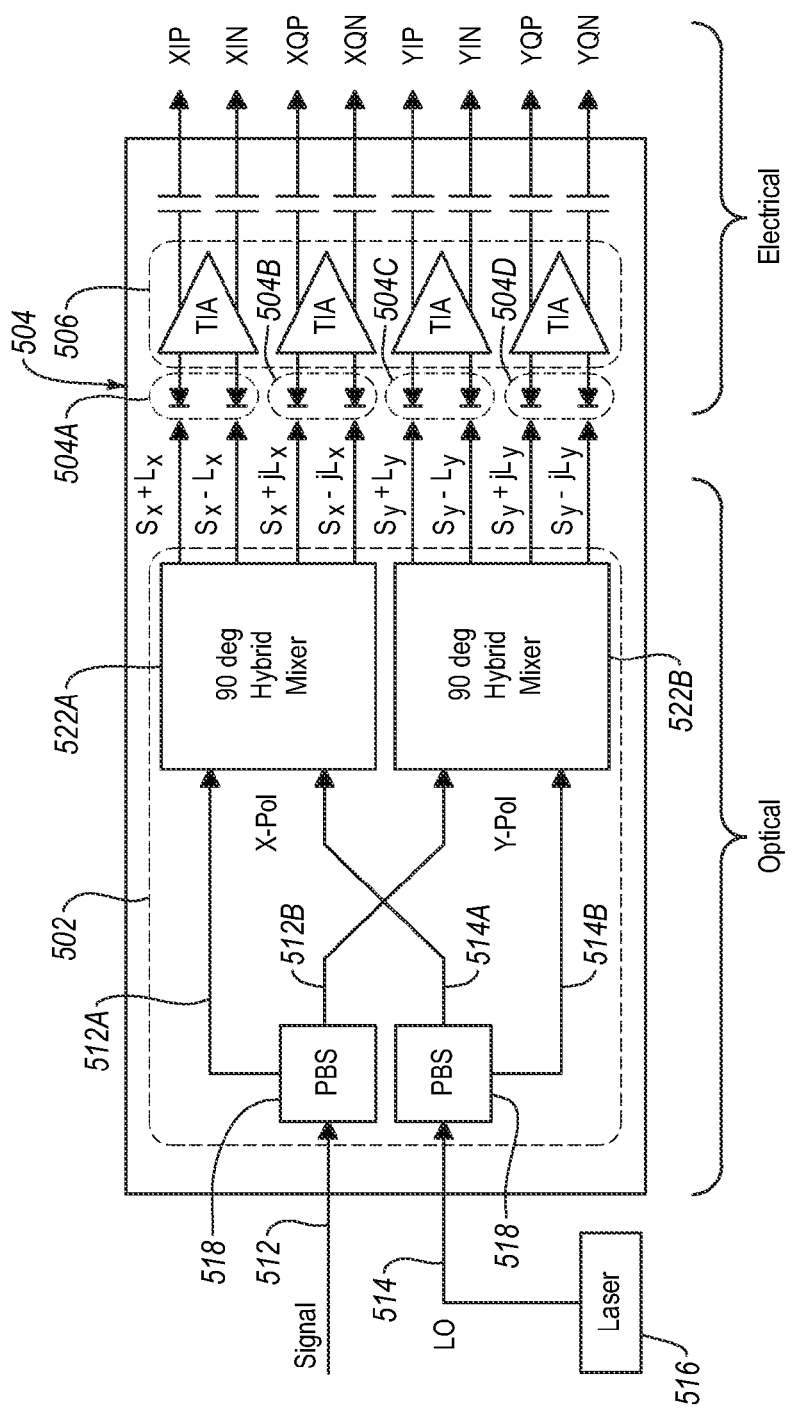

Additional details regarding example embodiments of the demodulator 502, optical detectors 504 and amplifiers 506 of the receive system 500 are provided in FIG. 5B. As illustrated in FIG. 5B, the demodulator 502 is configured to receive a DP-QPSK optical signal 512 and an LO optical signal 514 generated by a local oscillator 516 such as a DFB laser. Each of DP-QPSK optical signal 512 and LO optical signal 514 is split into two components by one or more polarization beam splitters ("PBS") 518.

In more detail, the DP-QPSK optical signal 512 is split into a first component 512A having a first polarization state (e.g., X polarization) and a second component 512B having a second polarization state (e.g., Y polarization) that is orthogonal to the first polarization state. The first component 512A is provided to a first 90 degree hybrid mixer 522A. The second component 512B is provided to a second 90 degree hybrid mixer 522B.

The LO optical signal 514 is also split into first and second components 514A, 514B that are respectively provided to the first and second 90 degree hybrid mixers 522A, 522B.

In general, the first 90 degree hybrid mixer 522A is configured to perform four 90 degree phase stepped interferences between the first component 512A of the DP-QPSK optical signal 512 and the first component 514A of the LO optical signal 514. In the illustrated embodiment, the first 90 degree hybrid mixer 522A is configured to output four interference signals, including two in-phase signals $S_x+L_x$ and $S_x-L_x$, and two quadrature-phase signals $S_x+jL_x$ and $S_x-jL_x$. The "x" subscript denotes that these interference signals are associated with the X-polarized first component 512A of the DP-QPSK optical signal 512.

The interference signals $S_x+L_x$, $S_x-L_x$, $S_x+jL_x$ and $S_x-jL_x$ output by the first 90 degree hybrid mixer 522A are converted to electrical signals by two pairs 504A, 504B of balanced opto-electrical converters included in the optical detectors 504. Alternatively, the first 90 degree hybrid mixer 522A may be configured to output two interference signals, including a single in-phase signal and a single quadrature-phase signal, and provide the two interference signals to two single-ended opto-electrical converters (not shown) included in the optical detectors 504.

Analogously, the second 90 degree hybrid mixer 522B is configured to perform four 90 degree phase stepped interferences between the second component 512B of the DP-QPSK optical signal 512 and the second component 514A of the LO optical signal 514. In the illustrated embodiment, the second 90 degree hybrid mixer 522B is configured to output four interference signals, including two in-phase signals $S_y+L_y$ and $S_y-L_y$, and two quadrature-phase signals $S_y+jL_y$ and $S_y-jL_y$. The "y" subscript denotes that these interference signals are associated with the Y-polarized second component 512B of the DP-QPSK optical signal 512.

The interference signals $S_y+L_y$, $S_y-L_y$, $S_y+jL_y$ and $S_y-jL_y$ output by the second 90 degree hybrid mixer 522B are converted to electrical signals by two pairs 504C, 504D of balanced opto-electrical converters included in the optical detectors 504. Alternatively, the second 90 degree hybrid mixer 522B may be configured to output two interference signals, including a single in-phase signal and a single quadrature-phase signal, and provide the two interference signals to two single-ended opto-electrical converters (not shown) included in the optical detectors 504.

III. First Embodiment of a DP-QPSK Demodulator

Figure 6A:
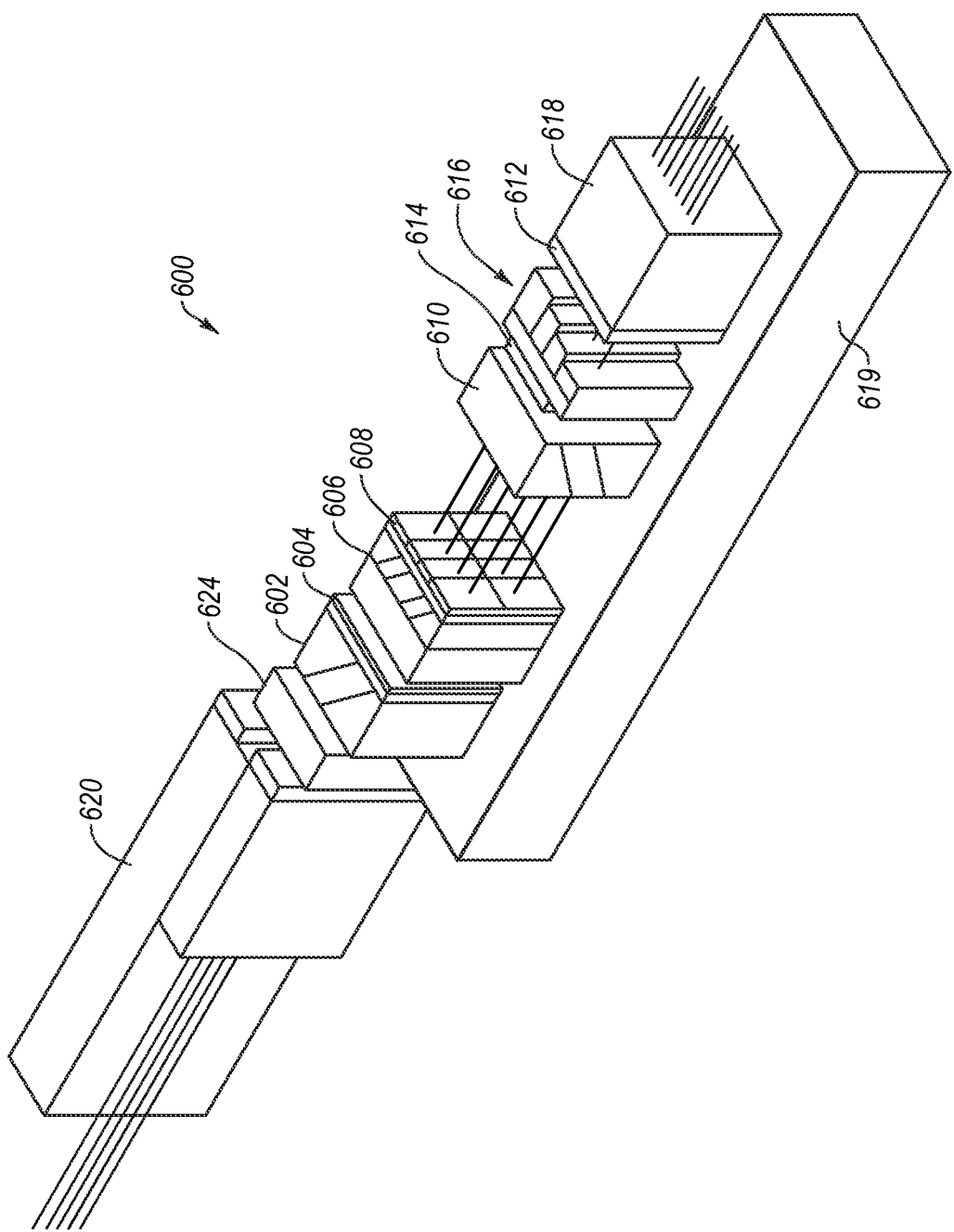
FIG. 6A illustrates a perspective view of an example DP-QPSK demodulator such as may be implemented in the transponder system of FIG. 1.

Turning to FIGS. 6A-6C, an example DP-QPSK demodulator 600 is illustrated according to some embodiments. FIG. 6A is a perspective view, FIG. 6B is a top view and FIG. 6C is a side view of the DP-QPSK demodulator 600. As shown in FIGS. 6A-6C, the DP-QPSK demodulator 600 includes a first polarization beam splitter ("PBS") 602, a first half waveplate ("HWP") 604, a second PBS 606, a second HWP 608, a third PBS 610, and a third HWP 612. Alternately or additionally, the DP-QPSK demodulator 600 further includes a quarter waveplate ("QWP") 614, an optical path compensator 616, and a beam displacer ("BD") 618.

Optionally, the foregoing components of DP-QPSK demodulator 600 may be formed on or otherwise coupled to a substrate 619. The substrate 619 may include fused silica or other suitable substrate material.

In FIGS. 6A-6C, the first HWP 604 is positioned to receive an output of the first PBS 602. Optionally, the first HWP 604 may be coupled to the first PBS 602. The second PBS 606 is positioned to receive an output of the first HWP 604. The second HWP 608 is positioned to receive an output of the second PBS 606. Optionally, the second HWP 608 may be coupled to the second PBS 606. The third PBS 610 is positioned to receive an output of the second HWP 608. The third HWP 612 is positioned to receive an output of the third PBS 610. The optical path compensator 616 is positioned between the third PBS 610 and the third HWP 612. The QWP 614 is positioned between the third PBS 610 and the optical path compensator 616. Optionally, the QWP 614 is coupled to the optical path compensator 616. The BD 618 is positioned to receive an output of the third HWP 612. Optionally, the third HWP 612 is coupled to the BD 618.

As shown in FIG. 6A, a fiber array 620 contains a signal mode fiber and polarization-maintaining ("PM") fiber, which may be provided for signal and LO optical inputs. Alternately or additionally, a lens array 624 may be provided for beam collimating.

As best seen in FIGS. 6B-6C, a single DP-QPSK signal 626 enters the first PBS 602. The first PBS 602 divides the DP-QPSK signal 626 into signal components $S_x$ and $S_y$ having orthogonal X and Y polarization states. In other words, at the input of the first PBS 602, the DP-QPSK signal 626 includes first and second orthogonally polarized signal components $S_x$ and $S_y$ that share a common optical signal path. The first PBS 602 separates the signal components $S_x$ and $S_y$ onto separate signal paths. The orthogonal polarization states X and Y at the input of the first PBS 602 are illustrated at 628 in FIG. 6D.

Next, the signal components $S_x$ and $S_y$ pass through the first HWP 604. In at least some example embodiments, a first portion of the first HWP 604 through which the signal component $S_x$ passes is oriented at about 22.5 degrees, and a second portion of the first HWP 604 through which the signal component $S_y$ passes is oriented at about −22.5 degrees. As used herein, the term "oriented at" refers to the orientation of the optical axis angle of a waveplate crystal with respect to the horizontal line. The first HWP 604 rotates the polarization states 628 (FIG. 6D) of the signal components $S_x$ and $S_y$ to the polarization states denoted at 629 in FIG. 6D.

Next, as best seen in FIG. 6B, the second PBS 606 divides signal component $S_x$ into two signal components $S_{x1}$ and $S_{x2}$ on separate signal paths and having orthogonal polarizations (e.g., horizontal and vertical polarizations, respectively). Additionally, the second PBS 606 divides signal component $S_y$ into two signal components $S_{y1}$ and $S_{y2}$ on separate signal paths and having orthogonal polarizations (e.g., horizontal and vertical polarizations, respectively). The respective polarization states of signal components $S_{x1}$, $S_{x2}$, $S_{y1}$ and $S_{y2}$ at the output of the second PBS 606 are denoted at 630 in FIG. 6D.

The signal components $S_{x1}$, $S_{x2}$, $S_{y1}$ and $S_{y2}$ next pass through the second HWP 608. The second HWP 608 rotates the polarization states 630 of the signal components $S_{x1}$, $S_{x2}$, $S_{y1}$ and $S_{y2}$ to the polarization states denoted at 631 in FIG. 6D.

Before proceeding at the third PBS 610, we will briefly return to the first PBS 602. As best seen in FIG. 6C, a single LO signal 632 enters the first PBS 602. At the input of the first PBS 602, the LO signal 632 may have a linear polarization state such as the polarization state denoted at 634 in FIG. 6D. The first PBS 602 divides the LO signal 632 into LO components $L_x$ and $L_y$ (FIG. 6C) on separate signal paths and having orthogonal X and Y polarization states. The signal paths of the LO components $L_x$ and $L_y$ may generally be similar to the signal paths of signal components $S_x$ and $S_y$ shown in FIG. 6B, although vertically displaced therebelow in the illustrated embodiment.

Next, the LO components $L_x$ and $L_y$ pass through the first HWP 604. In at least some example embodiments, LO component $L_x$ passes through the first portion of the first HWP 604, which is oriented at about 22.5 degrees, and LO component $L_y$ passes through the second portion of the first HWP 604, which is oriented at about −22.5 degrees. The first HWP 604 rotates the polarization states 628 (FIG. 6D) of the LO components $L_x$ and $L_y$ to the polarization states denoted at 636 in FIG. 6D.

Next, the second PBS 606 divides LO component $L_x$ into two components $L_{x1}$ and $L_{x2}$ (FIG. 6C) on separate signal paths and having orthogonal polarizations (e.g., horizontal and vertical polarizations, respectively). Additionally, the second PBS 606 divides LO component $L_y$ into two components $L_{y1}$ and $L_{y2}$ (FIG. 6C) on separate signal paths and having orthogonal polarizations (e.g., horizontal and vertical polarizations, respectively). The respective polarization states of components $L_{x1}$, $L_{x2}$, $L_{y1}$ and $L_{y2}$ at the output of the second PBS 606 are denoted at 637 in FIG. 6D. Additionally, the signal paths of components $L_{x1}$, $L_{x2}$, $L_{y1}$ and $L_{y2}$ may generally be similar to the signal paths of signal components $S_{x1}$, $S_{x2}$, $S_{y1}$ and $S_{y2}$ shown in FIG. 6B, although vertically displaced therebelow in the illustrated embodiment.

The components $L_{x1}$, $L_{x2}$, $L_{y1}$ and $L_{y2}$ next pass through the second HWP 608. In at least some example embodiments, portions of the second HWP 608 through which signal components $S_{x1}$, $S_{y1}$ and components $L_{x2}$, $L_{y2}$ pass are oriented at about 0 degrees, and portions of the second HWP 608 through which signal components $S_{x2}$, $S_{y2}$ and components $L_{x1}$, $L_{y1}$ pass are oriented at about 45 degrees. The second HWP 608 rotates the polarization states 637 of the components $L_{x1}$, $L_{x2}$, $L_{y1}$ and $L_{y2}$ to the polarization states denoted at 638 in FIG. 6D. As seen in FIG. 6D, the polarization states 638 of components $L_{x1}$, $L_{x2}$, $L_{y1}$ and $L_{y2}$ are orthogonal to the polarization states 631 of signal components $S_{x1}$, $S_{x2}$, $S_{y1}$ and $S_{y2}$.

As best seen with reference to FIG. 6C, the third PBS 610 includes first and second interfaces 610A, 610B. The third PBS 610 may be configured such that the signal components $S_{x1}$, $S_{x2}$, $S_{y1}$ and $S_{y2}$ are transmitted through the first interface 610A. The third PBS 610 may be further configured to reflect components $L_{x1}$, $L_{x2}$, $L_{y1}$ and $L_{y2}$ at both the second and first interfaces 610B, 610A so as to redirect components $L_{x1}$, $L_{x2}$, $L_{y1}$ and $L_{y2}$ such that they occupy the same signal paths as signal components $S_{x1}$, $S_{x2}$, $S_{y1}$ and $S_{y2}$. Because the polarization states 638 of components $L_{x1}$, $L_{x2}$, $L_{y1}$ and $L_{y2}$ are orthogonal to the polarization states 631 of signal components $S_{x1}$, $S_{x2}$, $S_{y1}$ and $S_{y2}$, the components $L_{x1}$, $L_{x2}$, $L_{y1}$ and $L_{y2}$ do not interfere with signal components $S_{x1}$, $S_{x2}$, $S_{y1}$ and $S_{y2}$, despite sharing common signal paths.

A first signal pair 640A including signal component $S_{x2}$ and component $L_{x2}$ passes through QWP 614. A second signal pair 640B including signal component $S_{y1}$ and component $L_{y1}$ also passes through QWP 614. In at least some example embodiments, the QWP 614 is oriented at about 0 degrees. A third signal pair 640C includes signal component $S_{x1}$ and component $L_{x1}$ and a fourth signal pair 640D includes signal component $S_{y2}$ and component $L_{y2}$. The QWP 614 may be configured to produce a 90 degree phase difference between signal pairs 640A, 640B and signal pairs 640C, 640D.

The first, second, third and fourth signals pairs 640A-640D pass through the compensator 616. The compensator 616 is configured to compensate for the different time delays experienced by the different signal components $S_{x1}$, $S_{x2}$, $S_{y1}$ and $S_{y2}$ due to different path lengths traveled through the DP-QPSK demodulator 600 such that they all have the same time delay after exiting the DP-QPSK demodulator 600. The compensator 616 may include crown glass or other suitable material. In some embodiments, the compensator 616 includes a borosilicate glass composition. Alternately or additionally, the compensator 616 may include a compensator commonly referred to as a bk7 compensator marketed by the Schott AG company.

The signal pairs 640A-640D next pass through the third HWP 612. In at least some example embodiments, the third HWP 612 is oriented at about 22.5 degrees. The third HWP 612 rotates the polarization states of the signal pairs 640A-640D to the polarization states denoted at 642 in FIG. 6D. In particular, the polarization state for each signal pair 640A-640D includes a first polarization state corresponding to component $L_{x1}$, $L_{x2}$, $L_{y1}$ or $L_{y2}$, and a second polarization state corresponding to signal component $S_{x1}$, $S_{x2}$, $S_{y1}$ or $S_{y2}$, respectively, the second polarization state being orthogonal to the first polarization state.

Next, the signal pairs 640A-640D enter the BD 618. The BD 618 divides the signal component $S_{x1}$ into two components having orthogonal polarization states, e.g., vertical and horizontal polarization states, on separate signal paths. The two components of signal component $S_{x1}$ may have substantially equal power in some embodiments. Similarly, the BD 618 divides the component $L_{x1}$ into two components having orthogonal polarization states, e.g., vertical and horizontal polarization states, on separate signal paths that are the same as the signal paths of the components of signal component $S_{x1}$. The two components of component $L_{x1}$ may have substantially equal power in some embodiments.

The components of signal component $S_{x1}$ may interfere constructively and destructively with the respective components of component $L_{x1}$ after being polarization-matched by the BD 618. In particular, constructive interference occurs between the components of each of signal component $S_{x1}$ and component $L_{x1}$ having the vertical polarization state to produce in-phase signal $S_x+L_x$ (FIG. 6B). Additionally, destructive interference occurs between the components of each of signal component $S_{x1}$ and component $L_{x1}$ having the horizontal polarization state to produce in-phase signal $S_x-L_x$ (FIG. 6B). In-phase signals $S_x+L_x$ and $S_x-L_x$ may then be provided to a pair of balanced opto-electrical converters (not shown).

In an analogous manner, the BD 618 divides each of signal components $S_{x2}$, $S_{y1}$ and $S_{y2}$ into two components having orthogonal polarization states on separate signal paths and divides each of components $L_{x2}$, $L_{y1}$ and $L_{y2}$ into two components having orthogonal polarization states on respective separate signal paths. Then, the components of signal component $S_{x2}$, $S_{y1}$ and $S_{y2}$ constructively and destructively interfere with the respective components of component $L_{x2}$, $L_{y1}$ and $L_{y2}$.

In particular, constructive interference occurs between the components of each of signal component $S_{x2}$ and component $L_{x2}$ having the vertical polarization state to produce quadrature-phase signal $S_x+jL_x$ (FIG. 6B). Additionally, destructive interference occurs between the components of each of signal component $S_{x2}$ and component $L_{x2}$ having the horizontal polarization state to produce quadrature-phase signal $S_x-jL_x$ (FIG. 6B). Quadrature-phase signals $S_x+jL_x$ and $S_x-jL_x$ may then be provided to a pair of balanced opto-electrical converters (not shown).

Analogously, constructive interference occurs between the components of each of signal component $S_{y1}$ and component $L_{y1}$ having the vertical polarization state to produce in-phase signal $S_y+L_y$ (FIG. 6B). Additionally, destructive interference occurs between the components of each of signal component $S_{y1}$ and component $L_{y1}$ having the horizontal polarization state to produce in-phase signal $S_y-L_y$ (FIG. 6B). In-phase signals $S_y+L_y$ and $S_y-L_y$ may then be provided to a pair of balanced opto-electrical converters (not shown).

Analogously, constructive interference occurs between the components of each of signal component $S_{y2}$ and component $L_{y2}$ having the vertical polarization state to produce quadrature-phase signal $S_y+jL_y$ (FIG. 6B). Additionally, destructive interference occurs between the components of each of signal component $S_{y2}$ and component $L_{y2}$ having the horizontal polarization state to produce quadrature-phase signal $S_y-jL_y$ (FIG. 6B). Quadrature-phase signals $S_y+jL_y$ and $S_y-jL_y$ may then be provided to a pair of balanced opto-electrical converters (not shown).

IV. Alternative Embodiments of a DP-QPSK Demodulator

The DP-QPSK demodulator 600 of FIGS. 6A-6C is merely illustrative of a DP-QPSK according to some embodiments. Various adjustments and modifications can be made to the DP-QPSK demodulator 600 of FIGS. 6A-6C within the scope of the disclosed embodiments. For instance, FIGS. 7A-7B include a top view and a side view of an alternative embodiment of a DP-QPSK demodulator 700A that is similar in some respects to the DP-QPSK demodulator 600 of FIGS. 6A-6C. For instance, the DP-QPSK demodulator 700A includes a first PBS 702, a first HWP 704, a second PBS 706, a second HWP 708, a third PBS 710, and a third HWP 712. Alternately or additionally, the DP-QPSK demodulator 700A further includes a QWP 714, an optical path compensator 716, and a BD 718.

In FIGS. 7A-7B, the first HWP 704 is positioned to receive an output of the first PBS 702. Optionally, the first HWP 704 may be coupled to the first PBS 702. The second PBS 706 is positioned to receive an output of the first HWP 704. The second HWP 708 is positioned to receive an output of the second PBS 706. Optionally, the second HWP 708 may be coupled to the second PBS 706. The third PBS 710 is positioned to receive an output of the second HWP 708. The third HWP 712 is positioned to receive an output of the third PBS 710. Optionally, the third HWP 712 may be coupled to the optical path compensator 716. The optical path compensator 716 is positioned to receive an output of the third PBS 710. The QWP 714 is positioned between the third PBS 710 and the optical path compensator 716. Optionally, the QWP 714 is coupled to the third HWP 712. The BD 718 is positioned to receive an output of the optical path compensator 716.

Optionally, the foregoing components of DP-QPSK demodulator 700A may be formed on or otherwise coupled to a substrate 719 (FIG. 7B). The substrate 719 may include fused silica or other suitable substrate material.

Operation of the DP-QPSK demodulator 700A is generally analogous to the operation of the DP-QPSK demodulator 600 of FIGS. 6A-6C and will not be described in detail. Generally, however, the DP-QPSK demodulator is configured to perform phase stepped interferences between both an X-polarization component and a Y-polarization component of an incoming DP-QPSK signal 720 and an LO signal 722 to produce four in-phase signals 724 (FIG. 7A), including a first pair 724A (e.g., $S_x+L_x$ and $S_x-L_x$) from the X-polarization component, and a second pair 724B (e.g., $S_y+L_y$ and $S_y-L_y$) from the Y-polarization component, and to produce four quadrature-phase signals 726 (FIG. 7A), including a first pair 726A (e.g., $S_x+jL_x$ and $S_x-jL_x$) from the X-polarization component and a second pair 726B (e.g., $S_y+jL_y$ and $S_y-jL_y$) from the Y-polarization component.

Optionally, and as illustrated in FIGS. 7A-7B, the DP-QPSK demodulator 700A may further include a plurality of optical fibers 728 positioned to receive the paired optical signals 724A, 726A, 724B, 726B that are output from the BD 718. The optical fibers 728 may include an 8×125 micrometer ("μm") ribbon fiber in some embodiments.

Alternately or additionally, the DP-QPSK demodulator 700A may further include a lens array 730 positioned between the BD 718 and the optical fibers 728.

According to some embodiments, the DP-QPSK demodulator 700A has a length l (FIG. 7B) of about 14 millimeters ("mm"), a height h (FIG. 7B) of about 2 mm, and a width w (FIG. 7A) of about 2.4 mm.

FIGS. 7C-7D illustrate another alternative embodiment of a DP-QPSK demodulator 700B according to some embodiments. FIG. 7C is a top view and FIG. 7D is a side view of the DP-QPSK demodulator 700B. The DP-QPSK demodulator 700B is similar in some respects to the DP-QPSK demodulator 700A of FIGS. 7A-7B and like reference numbers denote like elements. Additional details regarding the arrangement and operation of the DP-QPSK demodulator 700B of FIGS. 7C-7D are provided above with respect to the DP-QPSK demodulator 700A of FIGS. 7A-7B.

Optionally, and as illustrated in FIGS. 7C-7D, the DP-QPSK demodulator 700B may further include a plurality of balanced opto-electrical converters 732 positioned to receive the paired optical signals 724A, 726A, 724B, 726B that are output from the BD 718. The lens array 730 may be positioned between the BD 718 and the balanced opto-electrical converters 732.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A dual-polarization quadrature phase shift keyed ("DP-QPSK") demodulator comprising:
   a first polarization beam splitter that defines two input paths and four output paths;
   a first half waveplate positioned after the first polarization beam splitter;
   a second polarization beam splitter positioned after the first half waveplate, wherein the second polarization beam splitter defines four input paths and eight output paths;
   a second half waveplate positioned after the second polarization beam splitter;
   a third polarization beam splitter positioned after the second half waveplate, wherein the third polarization beam splitter defines eight input paths and four output baths; and
   a third half waveplate positioned after the third polarization beam splitter,
   wherein the first polarization beam splitter, the first half waveplate, the second polarization beam , the second half wavesplate the third polarization beam splitter, and the third half waveplate are positioned linearly one after the other.

2. The DP-QPSK demodulator of claim 1, wherein:
   the first half waveplate includes a first portion oriented at about 22.5 degrees, and a second portion oriented at about −22.5 degrees;
   the second half waveplate includes a first plurality of portions oriented at about 0 degrees, and a second plurality of portions oriented at about 45 degrees; and
   the third half waveplate is oriented at about 22.5 degrees.

3. The DP-QPSK demodulator of claim 1, further comprising an optical path compensator positioned between the third polarization beam splitter and the third half waveplate.

4. The DP-QPSK demodulator of claim 3, wherein each of the first and second half waveplates is physically coupled, respectively, to the first and second polarization beam splitters, and wherein the third half waveplate is physically coupled to the optical path compensator.

5. The DP-QPSK demodulator of claim 3, further comprising a quarter waveplate coupled to the optical path compensator and positioned in an optical signal path of at least one of a plurality of optical signals received from the third polarization beam splitter.

6. The DP-QPSK demodulator of claim 1, further comprising a beam displacer positioned after the third half waveplate.

7. The DP-QPSK demodulator of claim 6, wherein the third half waveplate is physically coupled to the beam displacer.

8. The DP-QPSK demodulator of claim 6, further comprising a plurality of balanced opto-electrical converters positioned to receive a plurality of optical signals output by the beam displacer.

9. The DP-QPSK demodulator of claim 8, further comprising a lens array positioned between the beam displacer and the plurality of balanced opto-electrical converters.

10. The DP-QPSK demodulator of claim 6, further comprising a plurality of optical fibers positioned to receive a plurality of optical signals output by the beam displacer.

11. The DP-QPSK demodulator of claim 10, further comprising a lens array positioned between the beam displacer and the plurality of optical fibers.

12. The DP-QPSK demodulator of claim 1, further comprising a substrate, wherein the first, second and third polarization beam splitters and the first, second and third half waveplates are coupled to the substrate.

13. The DP-QPSK demodulator of claim 12, wherein the DP-QPSK demodulator including the substrate is about 14 millimeters ("mm") long, about 2 mm high and about 2.4 mm wide.

14. An optoelectronic module comprising:
- a dual-polarization quadrature phase shift keyed ("DP-QPSK") demodulator including:
  - a first polarization beam splitter that defines two input paths and four output paths;
  - a first half waveplate positioned after the first polarization beam splitter;
  - a second polarization beam splitter positioned after the first half waveplate, wherein the second polarization beam splitter defines four input paths and eight output paths;
  - a second half waveplate positioned after the second polarization beam splitter;
  - a third polarization beam splitter positioned after the second half waveplate, wherein the third polarization beam splitter defines eight input paths and four output paths; and
  - a third half waveplate positioned after the third polarization beam splitter, wherein the first polarization beam splitter, the first half waveplate, the second polarization beam splitter, the second half waveplate, the third polarization beam splitter, and the third half waveplate are positioned linearly one after the other;
- a plurality of optical detectors positioned to receive a plurality of optical signals output by the DP-QPSK demodulator and configured to convert the plurality of optical signals to a plurality of electrical signals; and
- a digital signal processor electrically coupled to respective outputs of the plurality of optical detectors.

15. The optoelectronic module of claim 14, further comprising a plurality of analog to digital converters electrically coupled between the respective outputs of the plurality of optical detectors and respective inputs of the digital signal processor.

16. The optoelectronic module of claim 15, wherein each of the plurality of analog to digital converters is configured to convert a corresponding signal received from a respective one of the plurality of optical detectors into a corresponding digital signal.

17. The optoelectronic module of claim 16, wherein:
- the signals received from the plurality of optical detectors include first, second, third and fourth electrical signals respectively representing an X polarized in-phase optical signal, an X polarized quadrature-phase optical signal, a Y polarized in-phase optical signal, and a Y polarized quadrature-phase optical signal, all received and converted by the plurality of optical detectors into the first, second, third and fourth electrical signals;
- the digital signal processor is configured to receive first and second digital signals corresponding to the first and second electrical signals representing the X polarized in-phase optical signal and the X polarized quadrature-phase optical signal and use the first and second digital signals to match against a first point in a PSK constellation plot, and output a corresponding first bit sequence; and
- the digital signal processor is further configured to receive third and fourth digital signals corresponding to the third and fourth electrical signals representing the Y polarized in-phase optical signal and the Y polarized quadrature-phase optical signal and use the third and fourth digital signals to match against a second point in the PSK constellation plot, and output a corresponding second bit sequence.

18. The optoelectronic module of claim 14, wherein each of the plurality of optical detectors includes a pair of balanced opto-electrical converters.

19. The optoelectronic module of claim 14, wherein each of the plurality of optical detectors includes a single-ended opto-electrical converter.

20. The optoelectronic module of claim 14, further comprising a local oscillator configured to provide a local oscillator optical signal to the DP-QPSK demodulator.

* * * * *

UNITED STATES PATENT AND TRADEMARK OFFICE
CERTIFICATE OF CORRECTION

PATENT NO.        : 8,786,937 B2                                      Page 1 of 1
APPLICATION NO.   : 13/304948
DATED             : July 22, 2014
INVENTOR(S)       : Chen et al.

It is certified that error appears in the above-identified patent and that said Letters Patent is hereby corrected as shown below:

In the Claims

In Column 12, Line 21, in Claim 1, delete "output baths;" and insert -- output paths; --, therefor.

In Column 12, Lines 26-27, in Claim 1, delete "beam , the second half waveplate" and insert -- beam splitter, the second half waveplate, --, therefor.

In Column 14, Line 20, in Claim 17, delete "PS K" and insert -- PSK --, therefor.

Signed and Sealed this
Nineteenth Day of May, 2015

Michelle K. Lee
*Director of the United States Patent and Trademark Office*